United States Patent
Dennis et al.

(10) Patent No.: US 11,976,008 B2
(45) Date of Patent: May 7, 2024

(54) METHODS AND COMPOSITIONS TO INCREASE PERFORMANCE OF ASPHALT CEMENT CONCRETE COMPRISING RECYCLED ASPHALT PAVEMENT

(71) Applicant: Surface-Tech, LLC, La Jolla, CA (US)

(72) Inventors: Joseph A. Dennis, Lebanon, OH (US); Steven Santa Cruz, San Diego, CA (US); Phillip B. Blankenship, Richmond, KY (US)

(73) Assignees: Surface Tech, LLC, La Jolla, CA (US); Bakelite Chemicals LLC, Pernarth (GB)

( * ) Notice: Subject to any disclaimer, the term of this patent is extended or adjusted under 35 U.S.C. 154(b) by 0 days.

(21) Appl. No.: 18/130,342

(22) Filed: Apr. 3, 2023

(65) Prior Publication Data
US 2023/0312419 A1   Oct. 5, 2023

Related U.S. Application Data

(63) Continuation of application No. 16/888,180, filed on May 29, 2020, now Pat. No. 11,618,713.

(51) Int. Cl.
| C04B 26/26 | (2006.01) |
| C04B 16/06 | (2006.01) |
| C04B 20/10 | (2006.01) |
| C04B 40/00 | (2006.01) |
| E01C 19/10 | (2006.01) |
| E01C 19/48 | (2006.01) |
| C04B 111/00 | (2006.01) |

(52) U.S. Cl.
CPC ........... *C04B 26/26* (2013.01); *C04B 16/0691* (2013.01); *C04B 20/1029* (2013.01); *C04B 40/0046* (2013.01); *E01C 19/1004* (2013.01); *E01C 19/48* (2013.01); *C04B 2111/0075* (2013.01)

(58) Field of Classification Search
None
See application file for complete search history.

(56) References Cited

U.S. PATENT DOCUMENTS

| 9,469,944 | B2* | 10/2016 | Lang ................... C04B 16/0691 |
| 9,481,793 | B2* | 11/2016 | Huang ....................... C09C 1/48 |
| 10,711,413 | B2 | 7/2020 | Berrada |
| 2007/0261337 | A1 | 11/2007 | Whittaker |
| 2014/0130712 | A1* | 5/2014 | Davis ..................... C09J 195/00 |
| | | | 106/281.1 |
| 2015/0078823 | A1* | 3/2015 | Lang ....................... C04B 16/12 |
| | | | 524/5 |
| 2016/0251808 | A1 | 9/2016 | Coe |

(Continued)

*Primary Examiner* — John J Figueroa
(74) *Attorney, Agent, or Firm* — Procopio, Cory, Hargreaves & Savitch LLP

(57) ABSTRACT

The Present disclosure is related to hot-mix asphalt ("HMA") which open new price/performance areas to asphalt cement concrete ("ACC") pavement. Equivalent-performing pavement may be made at lower cost, or higher-performing pavement may be made at equivalent-to-prior-art cost. The amendments, recycled asphalt pavement ("RAP", and including recycled asphalt shingles ["RAS"]), and reinforcing fiber (aramid fiber) may be adjusted as described herein to achieve a desired price/performance target.

20 Claims, 2 Drawing Sheets

(56) References Cited

U.S. PATENT DOCUMENTS

| | | |
|---|---|---|
| 2017/0145640 A1 | 5/2017 | Coe |
| 2017/0190619 A1* | 7/2017 | Crews ...................... C09D 7/43 |
| 2021/0284574 A1* | 9/2021 | Kurth ...................... C04B 26/26 |

* cited by examiner

US 11,976,008 B2

METHODS AND COMPOSITIONS TO INCREASE PERFORMANCE OF ASPHALT CEMENT CONCRETE COMPRISING RECYCLED ASPHALT PAVEMENT

CONTINUITY AND CLAIM OF PRIORITY

This application is a continuation of U.S. patent application Ser. No. 16/888,180 filed May 29, 2020, entitled "METHODS & COMPOSITIONS TO INCREASE PERFORMANCE OF ASPHALT CEMENT CONCRETE COMPRISING RECYCLED ASPHALT PAVEMENT". The disclosure of the foregoing application is hereby incorporated by reference in its entirety.

FIELD

The invention relates to compositions of asphalt cement concrete. More specifically, the invention relates to plant delivered asphalt cement concrete additives and mixing methods to improve the performance of paving materials made with recycled asphalt pavement and related recyclable materials.

BACKGROUND

Asphalt Cement Concrete ("ACC," or often just "asphalt") is widely used as a paving material to surface roads, runways and parking lots. By some estimates, up to 90% of all such surfaces are made with ACC. Even Portland Cement Concrete ("PCC") pavements can be repaired using the ACC which extends both the service life and ride of the older PCC below. A basic asphalt concrete comprises asphalt (also known as bitumen), a highly-viscous or semi-solid form of petroleum; and aggregates such as stone, sand or gravel, in about a 1:19 ratio (5% asphalt, 95% aggregate). The ingredients are heated, mixed, spread on the surface to be paved (often an earthen, stone or crushed-rock bed) and compacted to form ACC.

A variety of additives can be added to asphalt cement concrete to improve its strength, durability, performance or construction characteristics. In addition, careful control of aggregate size, shape and composition can significantly improve ACC characteristics. Because of the enormous amount of ACC used around the world, even modest improvements in performance or handling can yield significant benefits.

Fresh ACC can be used to resurface previously-laid ACC or PCC pavements that have become damaged through weathering or use. For resurfacing, upper layers of the older pavement may be ground away or removed to provide an improved base upon which to place the new ACC surface layer. Grinding and other ACC removal produces a material that is similar to the aggregate coated with aged bitumen used in ACC, so old ACC can be recycled. This material is known as Recycled Asphalt Pavement, or "RAP." Its use can reduce the amount (and therefore the expense) of virgin aggregate and bitumen, but the weathered, oxidized bitumen and other elements present in RAP impair the performance of ACC made using RAP. Because of this drop in performance most agencies limit the amount of RAP that can be used in the production of ACC to 10% to 25% of the aggregate weight. Materials and techniques that that permit increased use of RAP for aggregate and bitumen in new ACC may be of significant value in this field.

SUMMARY

A hot-mix asphalt ("HMA") paving material comprising aggregate with at least 10% by weight of recycled asphalt pavement ("RAP") having improved price/performance can be made using asphalt cement (bitumen), aramid fibers, and a liquid bitumen modifier, by heating and mixing these ingredients together into a substance suitable for placing and compacting with prior-art machinery and processes to form a smooth, semi-permeable paved surface.

DETAILED DESCRIPTION

Figure 1:
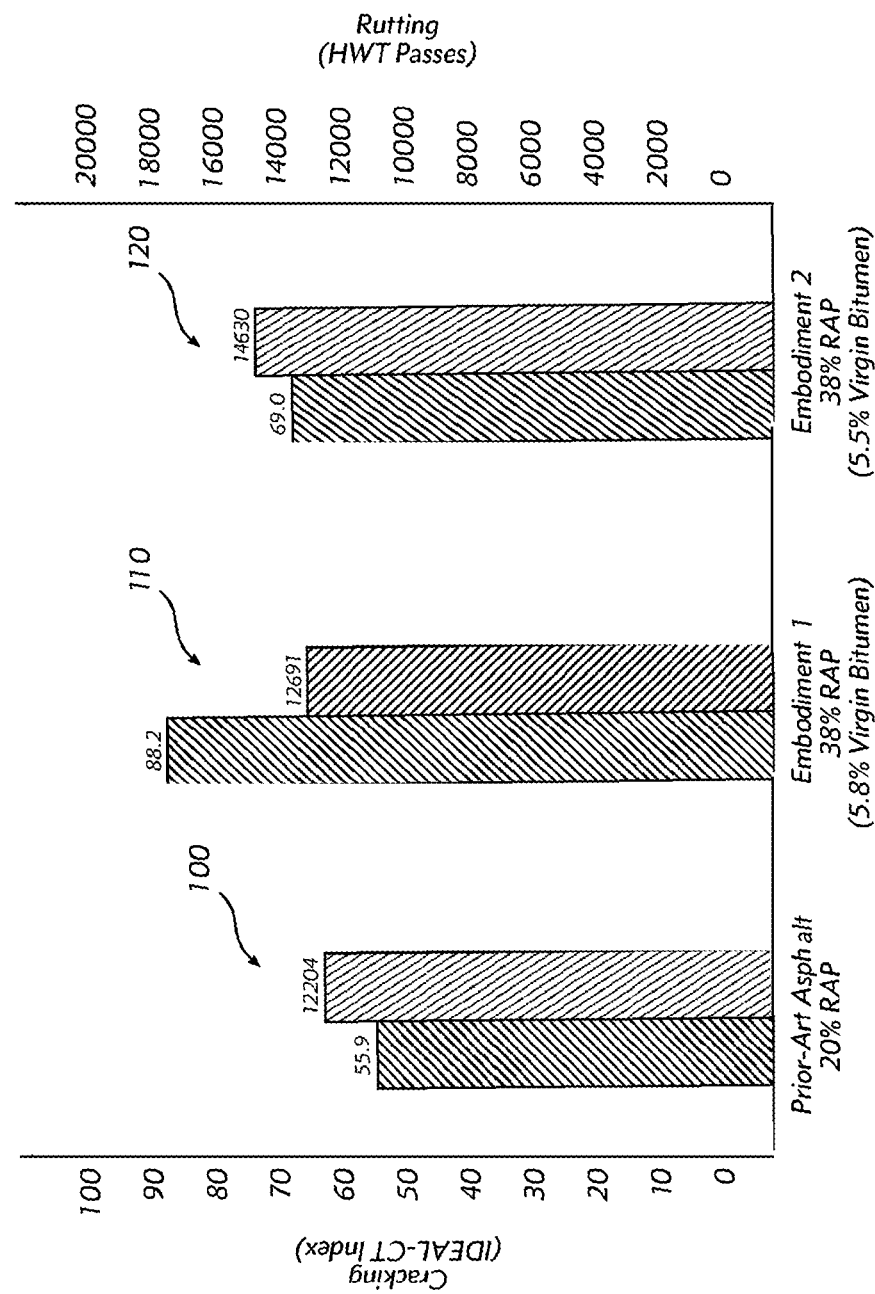
FIG. 1 shows a performance comparison between prior-art ACC containing 20% RAP, and two alternate formulations according to an embodiment, each containing 38% RAP.

The economic and environmental benefits of recycling damaged or degraded asphalt pavement to replace a portion of the aggregate and bitumen components of new asphalt cement concrete are substantial, but pavement constructed with RAP often fails to meet expectations because of the differences between the aged bitumen of the RAP and virgin bitumen. As RAP percentage approaches about 20% by weight of aggregate, the cracking and rutting performance of the freshly-laid pavement deteriorates, mostly due to the removal of virgin bitumen in lieu of the aged bitumen contribution from the RAP source. This reduction in virgin bitumen results in reducing the ACC expected service life and negating the cost savings of using RAP. An embodiment of the present invention adds two additional ingredients to the HMA mix. With these ingredients, RAP percentages exceeding 20% (even going as high as 60% or more, for some service conditions) the pavement will perform as well as a mix with little or no RAP, but at a lower cost. FIG. 1 compares cracking and rutting performance between asphalt with 5.6% virgin bitumen and 20% RAP (but no other additives) 100, asphalt with 5.8% virgin bitumen and 38% RAP and the inventive amendments 110; and asphalt with 5.5% virgin bitumen and 38% RAP and the inventive amendments 120. Note that both embodiments 110 and 120 outperform 5.6% virgin bitumen and 20% RAP-containing asphalt 100. It is important to also point out that by adding the inventive amendments embodiment 120 improved both the cracking and rutting performance of embodiment 110 with less virgin bitumen which delivers a lower cost but better performing end product. Lastly, this performance enhancement requires the use of both inventive amendments. Neither inventive amendment on its own will achieve this level of improved performance—the combination performs unexpectedly well.

The first ingredient that is present in an embodiment is of a class commonly referred to as a "liquid binder modifier." (Other known names include "bio-oil," "rejuvenator," "softener," "recycling agent" and "warm mix additive.") The salient function of the liquid binder modifier is to lower the performance grade ("PG") of the virgin liquid bitumen, and specifically, to lower a measured parameter, $\Delta Tc$. For purposes of the present disclosure, a "liquid binder modifier" is defined to be a viscous liquid substance, compatible with asphalt (bitumen) and other ACC ingredients, that lowers the asphalt binder low temperature grade by at least one grade—i.e., "−22" binder becomes a "−28" or "−34" or lower.

It is appreciated that known liquid binder modifiers tend to improve asphalt cracking performance (i.e. to reduce the incidence of cracking), but also to have a deleterious effect on rutting performance (ACC pavement with a liquid binder modifier added tends to perform worse on a rutting test such as a Hamburg Wheel test).

To restore rutting performance to a pavement comprising a liquid binder modifier (which is helpful to allow increased RAP percentages), the inventors have added a fibrous material, such as aramid fiber. When added as described below, the added fibers are distributed throughout the HMA and help hold bitumen-coated aggregate pieces together securely yet flexibly, which improves rutting performance without adversely impacting cracking performance.

Figure 2:
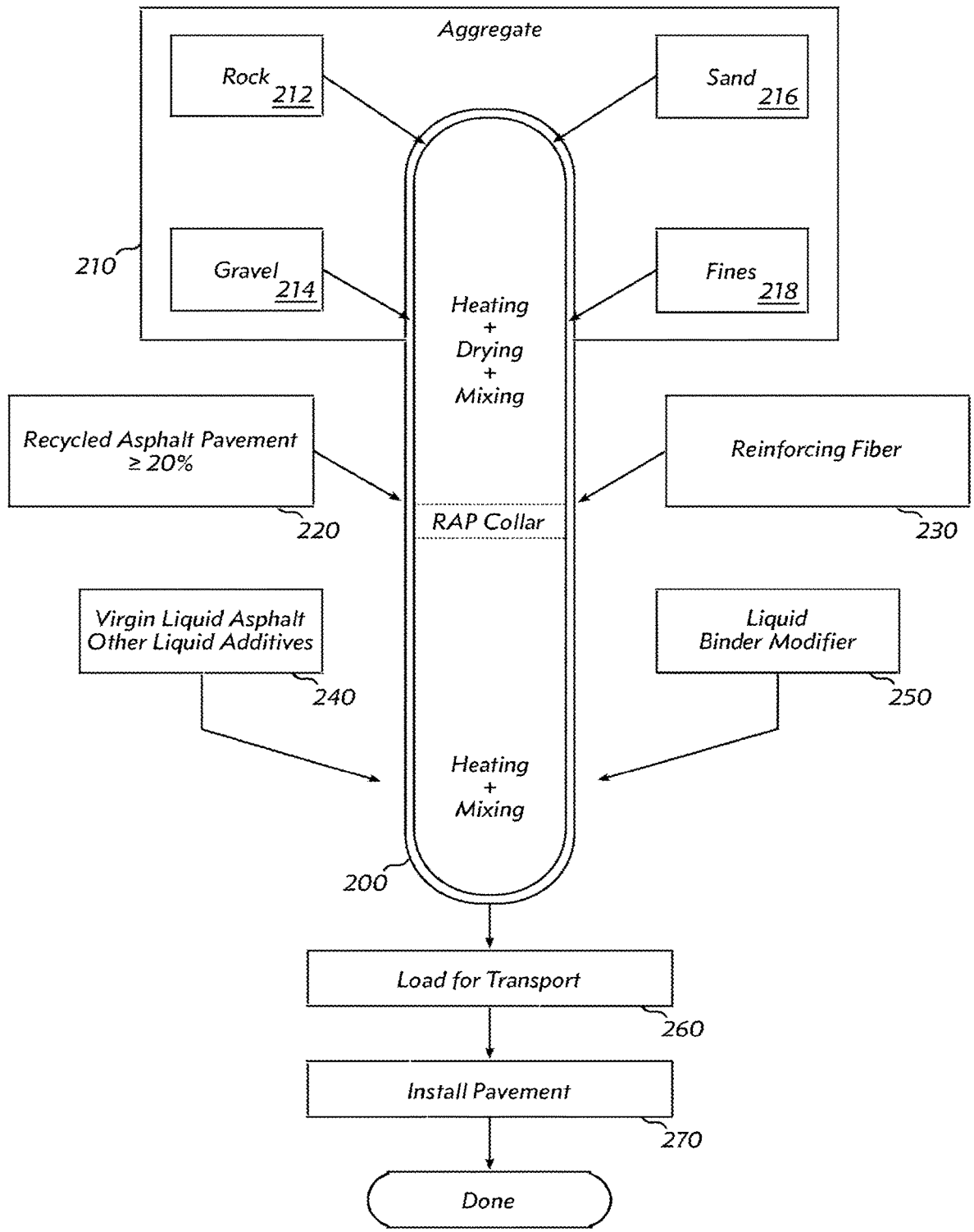
FIG. 2 outlines a plant-mix ACC production process according to an embodiment.

FIG. 2 outlines a method of preparing hot-mix asphalt ("HMA") in a plant setting. Suitable amounts of aggregates (210) are heated, dried and mixed together at the head or beginning end of a continuous manufacturing process (represented by double ovals 200). The aggregate may include rock or crushed rock 212, gravel 214, coarse and fine sands 216; and/or finer material ("fines") 218, in relative amounts according to a mix recipe designed to meet particular service requirements. Further along in the process, recycled asphalt pavement ("RAP") (220) is added to the hot, dry aggregate. In this embodiment, at least 20% by weight of the total aggregate is RAP. (In other words, the weight of RAP 220 added is at least ¼ as much as the weight of aggregate 210—4 tons of aggregate plus 1 ton of RAP equals 5 tons total, of which 20% is RAP.) The RAP may be introduced through a "RAP collar" portion of a continuous mixing plant.

At about the same place in the process (i.e., also through the RAP collar), a suitable amount of reinforcing fiber 230 is added. Details of the amount of fiber, its condition, and techniques for introducing it so that it is mixed uniformly are discussed below.

Finally, virgin liquid asphalt (bitumen) 240 and liquid binder modifier 250 are added to the hot, dry, well-mixed aggregate including at least 20% by weight of RAP and the reinforcing fiber. The liquid asphalt may include other liquid additives that impart desired characteristics to the finished ACC. All these ingredients are mixed briefly in a highly dynamic environment with conditions suited to ensure that all of the aggregate particles and reinforcing fibers are well-coated with asphalt, and the distribution of fibers and various particle sizes is uniform throughout the mixture.

Once hot-mix asphalt ("HMA," at about 300~350° F.) or warm-mix asphalt (200~280° F.) is thoroughly and homogenously mixed, it is loaded onto trucks for transport (260), taken to a pavement installation location and installed using prior-art machinery and techniques (270). The result is an Asphalt Cement Concrete having a reduced cost (due to the substantial RAP fraction) but with performance characteristics equaling or exceeding prior-art ACC containing less or no RAP.

Liquid Binder Modifier

A first important ingredient in an embodiment is the liquid binder modifier. A number of substances are suitable for use—many of these are waste products from other industrial processes or from recycling, so the ability to apply them here is an environmentally favorable use of materials that would otherwise be hazardous or toxic waste. Tree oils, corn oils, soybean oils are examples of these types of products from both the forestry and agricultural industries.

Several commercially-available products have also been identified as suitable for this application. These products are often of proprietary formulation, but because they are common items available from reliable suppliers, practitioners of ordinary skill can obtain a useable product without undue experimentation. One proprietary substance is TUFFTREK® 4002 and/or 4007 from Georgia Pacific. This is believed to be a corn-based oil which reacts during heating and mixing to become somewhat adhesive or "sticky." Another proprietary substance is Delta S from Collaborative Aggregates. This product is described as a dynamic rheology modifier, which means it lifts the damaged or oxidized modifier from the RAP, repairs the damaged oxidized asphalt and then re-establishes the bonding to the aggregate. Another proprietary product is Anova from Cargill. This product is described as a viscosity reducer and rheology modifier that reduces the low temperature grade of the asphalt binder and/or produce paving grade bitumen from non-conventional streams, i.e., RAP. Another proprietary product is Revive® from Road Science. This product is known as a Green alternative that is bio-renewable and improves low temperature properties of the mix which will compensate for the RAP inclusion.

Reinforcing Fibers

A second important ingredient in an embodiment is the reinforcing fiber. Tough, fine synthetic fibers such as nylon and polyethylene terephthalate ("PET") are useable, but the inventors have found aramid fibers to perform especially well. Fibers should be cut to lengths between about 10 mm and about 100 mm. Lengths need not be uniform, but one preferred method of introducing the reinforcing fiber is to sever segments of suitable length from a "rope" or "yarn" comprised of many individual fibers bundled together. This method creates many fibers of similar length (all of the fibers from each severed segment are about the same length). These segments of rope or yarn fray during the mixing process to release individual fibers throughout the mix. In contrast, large bunches or wads of fiber introduced at one time may become clotted together by liquid asphalt and may fail to distribute evenly during mixing.

A particularly favorable method of introduction is to wet small bundles of fibers (individual yarn or rope segments, or small wads of separate fibers) with a liquid (water, or a petroleum or petroleum-compatible liquid) or wax coating during production of the fibers or near the time of introduction to the mix. The wetted or wax coated bundles are less likely to be carried away by air currents resulting from the heating and mixing activity, and clumps are less likely to become clotted or stuck together so that fibers cannot be dislodged and distributed uniformly throughout the mix.

Sample Mixtures

Adding or increasing the amount of RAP in an existing mix designs require consideration for virgin liquid asphalt % content, and the gradation and amount of virgin aggregates being replaced with the available RAP gradation. Since RAP will have a known type and amount of oxidized binder on the aggregate, this amount of available oxidized binder can replace some of the original virgin binder required in the mix design. For example, if the current mix design has no RAP component, the mix design may have a total asphalt content of 5% (or 5% of total weight or per ton of mix) or 5%×2000 lb or 100 lbs of the total mix is liquid asphalt. Now if we add 40% RAP by weight which has an asphalt content of 5.5%, the RAP contribution is 40%×2000×5.5% or 44 lbs. This means in order to hold the original asphalt content at 5% or 100 lbs, the new mix design will use 44 lbs of asphalt from the RAP leaving only 56 lbs of virgin asphalt required. The liquid binder modifier will further reduce this need for virgin asphalt by another 1 to 6 lbs depending on the amount of liquid binder modifier used and the desired performance expectations in cracking and rutting performance. Aramid reinforcing fiber is also added in at a rate of 1 oz to 6 oz per mix ton to improve the desired performance values. The performance of an embodiment can be confirmed, and the liquid binder modifier and reinforcing fiber amounts fine-tuned, by testing the new high-RAP mix using IDEAL CT for Crack Testing (ASTM-D8225) or similar and The Hamburg Wheel Tracker for Rutting (AASHTO T324) to determine the optimal amount of both the liquid binder modifier and aramid reinforcing fiber used. In general, more of these products will be required as the RAP % increases to hold similar performance of the lower % RAP mix. However, by varying the amount of both or either products, cracking and or rutting performance can be enhanced beyond the capabilities of the lower RAP % mix design while providing a cost savings.

The inventors have characterized two particular mix designs and have found them to provide excellent performance at a price lower than can be achieved for a prior-art recipe. These are:

| Material | Amount (%) | Material | Amount (%) |
|---|---|---|---|
| Aggregate Total % | 59.75 | Aggregate Total % | 48.44 |
| RAP % | 36.62 | RAP % | 48.44 |
| Virgin Binder % | 3.52 | Virgin Binder % | 2.97 |
| Liq. Binder Mod. % | .11 | Liq. Binder Mod. % | .16 |
| Aramid Fiber oz. | 2.1 | Aramid Fiber oz. | 2.8 |
| Total % | 100 | Total % | 100 |

Ratios and Percentages

Note that in the foregoing description, amounts of various ingredients used in embodiments are given variously as percentages, ratios, weights per mix-ton, and so on. These measurements and usages are chosen to be familiar to engineers working with ACC. For clarity in interpreting the claims, inventors set forth the following definitions:

Amount of RAP in a mixture design, generally given as a percentage, means that the weight of RAP equals the stated percentage of the weight of all aggregate (including the RAP) in a mixture. RAP includes all of aggregate, aged bitumen and any trace ingredients present in the original pavement mixture, but most of the weight of RAP is contributed by the aggregate (the original pavement mixture would likely have been about a 19:1 or 5% bitumen ratio). The amount of aged bitumen may be calculated and used to adjust the amount of virgin bitumen in a mixture that incorporates RAP to achieve the total bitumen % (virgin+RAP).

Total amount of bitumen (virgin+RAP) in a mixture design, generally given as a percentage near 5%, refers to the total weight of bitumen as a fraction of the total finished weight of the mixture. Since RAP includes some (aged, oxidized) bitumen, an inventive mixture may reduce the amount of virgin bitumen added by some or all of the amount of bitumen contributed by the RAP. This reduction is responsible, in part, for the reduced cost of an embodiment.

For example, suppose a mixture according to an embodiment comprises 25% RAP, and the RAP had been made with 19 parts virgin aggregate and 1 part virgin bitumen (a 5% mixture). One mix ton of the inventive embodiment with total bitumen added (virgin+RAP) to achieve a 200:9 ratio (4.5%) would include:

| Ingredient | Computation | Weight |
|---|---|---|
| Total Bitumen | 2000 lbs* 4.5% | 90 lbs |
| Total Aggregate | 2000 lbs − 90 lbs | 1910 lbs |
| RAP Aggregate | 1910 lbs*25%= | 477.5 lbs |
| RAP Bitumen | 477.5 lbs* 5% | 23.88 lbs |

-continued

| Ingredient | Computation | Weight |
|---|---|---|
| Virgin Bitumen | 90 lbs − 23.88 lbs | 66.12 lbs |
| Virgin Airn: regate | 1910 lbs − 477.5 lbs | 1432.5 lbs |
| Liquid Binder Modifier[1] | trace | 1-6 lbs |
| Reinforcing Fiber[2] | trace | 1-6 oz |

[1]The amount of liquid binder modifier will further offset the total virgin bitumen added to the inventive mixture by replacing the amount that is added to the mixture in %, but typically 1 to 6% (or 1 to 6 lbs) of the virgin bitumen content.
[2]The amount of reinforcing fiber added is not accounted for as the weight is so small it does not change the volumetrics of the mix design but is typically .003 to .018% (or 1 to 6 oz) per ton of asphalt.

Liquid binder modifiers may be stated as a weight or volume per mix-ton, e.g. 50 pounds per mix ton or 10 gallons per mix ton. The stated amount or range of a liquid binder modifier is added to the asphalt during manufacture.

Reinforcing fibers, including preferably aramid reinforcing fibers, may be stated as weight per mix-ton. Reinforcing fibers are generally low mass, so suitable amounts may be between about 1 oz per mix-ton and about 6 oz per mix-ton.

Other Recyclables

It is appreciated that asphalt (bitumen) is used in other industrial materials, which may be suitable to substitute for a portion of aggregate and virgin bitumen in an embodiment. Principal among these are asphalt shingles, which contain a larger proportion (by weight) of asphalt than RAP does, and whose other components are compatible or suitable for use as a portion of the aggregate in an embodiment. Thus, RAP (recycled asphalt pavement) should be understood to include RAS (recycled asphalt shingles).

The applications of the present invention have been described largely by reference to specific examples and in terms of particular allocations of functionality to certain ingredients or processing techniques. However, those of skill in the art will recognize that asphalt cement concrete incorporating 20% or more RAP by weight of aggregate can also be produced mix designs and manufacturing processes different than those herein described. Such variations and implementations are understood to be captured according to the following claims.

We claim:

1. A hot-mix asphalt ("HMA") paving material comprising:
    an aggregate including:
        at least 10% by weight of recycled asphalt pavement ("RAP"), the RAP including oxidized bitumen;
    asphalt binder (virgin bitumen);
    reinforcing fibers; and
    a liquid binder modifier that lowers the asphalt binder low temperature grade of the aggregate by at least one grade, wherein
        the aggregate is to be placed and compacted by a paving machine to form a smooth surface.

2. The HMA paving material of claim 1, wherein the liquid binder modifier lowers the asphalt binder low temperature grade by at least six grades.

3. The HMA paving material of claim 2, wherein the liquid binder modifier lowers the asphalt binder low temperature grade by at least twelve grades.

4. The HMA paving material of claim 1, wherein the aggregate includes from about 1 weight percent (wt. %) to about 6 wt. % of the liquid binder modifier with respect to the weight of the aggregate.

5. The HMA paving material of claim 1, the aggregate is a homogeneous aggregate.

6. The HMA paving material of claim 1, wherein an amount of the reinforcing fibers is from about 1 oz per mix ton to about 6 oz per mix ton.

7. The HMA paving material of claim 1, wherein the reinforcing fibers are aramid fibers.

8. The HMA paving material of claim 7, wherein the aramid reinforcing fibers are between 10 mm and 100 mm in length.

9. The HMA paving material of claim 1, wherein the liquid binder modifier lowers the Performance Grade (PG) of the asphalt binder from −22 to −28.

10. The HMA paving material of claim 1, wherein the liquid binder modifier lowers the Performance Grade (PG) of the asphalt binder from −22 to −34.

11. The HMA paving material of claim 1, wherein the liquid binder modifier includes bio-oil, tree oils, corn-based oils, or soybean oils, or a combination thereof.

12. A suite of materials for increasing performance of asphalt cement concrete ("ACC") pavement made with at least 10% recycled asphalt pavement ("RAP") containing oxidized bitumen and asphalt binder (virgin bitumen), comprising:
   a first quantity of aramid fibers having lengths between 20 mm and 80 mm; and
   a second quantity of a liquid binder modifier that lowers the asphalt binder low temperature grade of the ACC by at least one grade.

13. The suite of materials of claim 12, wherein the liquid binder modifier lowers the asphalt binder low temperature grade by at least six grades.

14. The suite of materials of claim 13, wherein the liquid binder modifier lowers the asphalt binder low temperature grade by at least twelve grades.

15. The suite of materials of claim 12, wherein the suite of materials includes from about 1 weight percent (wt. %) to about 6 wt. % of the liquid binder modifier with respect to the weight of the suite of materials.

16. The suite of materials of claim 12, wherein an amount of the aramid fibers is from about 1 oz per mix ton to about 6 oz per mix ton.

17. The suite of materials of claim 12, wherein the ratio between the first quantity and the second quantity is from about 12 to about 72.

18. The suite of materials of claim 12, wherein the liquid binder modifier lowers the Performance Grade (PG) of the asphalt binder from −22 to −28.

19. The suite of materials of claim 12, wherein the liquid binder modifier lowers the Performance Grade (PG) of the asphalt binder from −22 to −34.

20. The suite of materials of claim 12, wherein the liquid binder modifier includes bio-oil, tree oils, corn-based oils, or soybean oils, or a combination thereof.

* * * * *